US012807170B2

(12) United States Patent
Lee et al.

(10) Patent No.: US 12,807,170 B2
(45) Date of Patent: Nov. 24, 2026

(54) METHOD FOR PROVIDING DRIVING MODE INFORMATION AND A DEVICE USING THE SAME

(71) Applicants: HYUNDAI MOTOR COMPANY, Seoul (KR); KIA CORPORATION, Seoul (KR)

(72) Inventors: Myoung Won Lee, Hanam-si (KR); Jae Hun Jung, Yongin-si (KR); Jae Hong Park, Busan (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 20 days.

(21) Appl. No.: 18/753,833

(22) Filed: Jun. 25, 2024

(65) Prior Publication Data

US 2025/0187622 A1 Jun. 12, 2025

(30) Foreign Application Priority Data

Dec. 12, 2023 (KR) ........................ 10-2023-0180177

(51) Int. Cl.
*B60W 50/14* (2020.01)
*B60W 40/08* (2012.01)
*G07C 5/00* (2006.01)
*H04W 4/40* (2018.01)

(52) U.S. Cl.
CPC ............ *B60W 50/14* (2013.01); *B60W 40/08* (2013.01); *G07C 5/008* (2013.01); *H04W 4/40* (2018.02); *B60W 2050/146* (2013.01); *B60W 2756/10* (2020.02)

(58) Field of Classification Search
CPC .. B60W 50/14; B60W 40/08; B60W 2756/10; B60W 2050/146; H04W 4/40; G07C 5/008
See application file for complete search history.

(56) References Cited

U.S. PATENT DOCUMENTS

2017/0349185 A1* 12/2017 McNew .............. B60W 50/082
2021/0217101 A1* 7/2021 Slusar ...................... G08G 1/20
2021/0394800 A1* 12/2021 Kwak .................. G07C 5/0808
2024/0062667 A1* 2/2024 Kemble .................. G06F 18/22

OTHER PUBLICATIONS

Submitted by the Expert From ITU, Identification of the Status of a Vehicle with ADS, Informal document. GRVA-15-15/Rev.2 15th GRVA, Jan. 23-27, 2023 Agenda item 4(e), https://unece.org/sites/default/files/2023-01/GRVA-15-15r2e.pdf, 4 pp.

* cited by examiner

*Primary Examiner* — Navid Z. Mehdizadeh
*Assistant Examiner* — Matthew Ho
(74) *Attorney, Agent, or Firm* — Lempia Summerfield Katz LLC

(57) ABSTRACT

A method for providing driving mode information and a device using the same are provided. The method includes acquiring a request for driving mode information of a host vehicle from a monitoring terminal outside the host vehicle. The method also includes checking the driving mode information corresponding to the host vehicle. The method additionally includes determining whether driver action conditions corresponding to the driving mode information are satisfied based on driver state information of the host vehicle. The method further includes providing at least some of the driving mode information to the monitoring terminal based on the determination result.

14 Claims, 3 Drawing Sheets

METHOD FOR PROVIDING DRIVING MODE INFORMATION AND A DEVICE USING THE SAME

CROSS-REFERENCE TO RELATED APPLICATION

This application claims the benefit of and priority to Korean Patent Application No. 10-2023-0180177, filed in the Korean Intellectual Property Office on Dec. 12, 2023, the entire contents of which are hereby incorporated herein by reference.

TECHNICAL FIELD

The present disclosure relates to a method for providing driving mode information and a device using the same.

BACKGROUND

Conventionally, to reduce a risk of an occurrence of a large-scale traffic accident, if a driver of a vehicle in which an autonomous driving system does not operate performs other actions while driving (for example, if the driver watches TV or plays a game while driving), police imposed a penalty, such as a fine, on the driver. On the other hand, in principle, a passenger in a driver's seat of a vehicle with the autonomous driving system operating at a certain level (e.g., a level 3) or higher is free to perform actions other than driving.

Therefore, to regulate the driver who performs actions other than driving in the vehicle in which the autonomous driving system is not operating, it is necessary to accurately provide the police with information on whether the vehicle is currently traveling in an autonomous driving mode.

As one of methods for providing such information, a method of indicating whether the autonomous driving mode is activated via an indicator light mounted on the vehicle is being discussed. However, if such a method is used, information on whether the autonomous driving mode is activated may also be provided to a third party other than the police. In some cases, other drivers around a host vehicle may intentionally interfere with autonomous driving of the host vehicle.

SUMMARY

Therefore, a method for effectively transmitting the information on whether the traveling vehicle is traveling in the autonomous driving mode is desired.

The present disclosure has been made to solve the above-mentioned problems occurring in the prior art while advantages achieved by the prior art are maintained intact.

Aspects of the present disclosure provide a method for providing driving mode information of a traveling vehicle and a device using the same.

Aspects of the present disclosure provide a method for providing driving mode information of a traveling vehicle based on a V2X communication and a device using the same.

Aspects of the present disclosure provide a method for accurately providing driving mode information of a traveling vehicle to a specific target terminal and a device using the same.

The technical problems to be solved by the present disclosure are not limited to the aforementioned problems. Other technical problems not mentioned herein should be more clearly understood from the following description by those having ordinary skill in the art to which the present disclosure pertains.

According to an aspect of the present disclosure, a method is provided. The method includes acquiring a request for driving mode information of a host vehicle from a monitoring terminal outside the host vehicle. The method also includes checking the driving mode information corresponding to the host vehicle. The method additionally includes determining whether driver action conditions corresponding to the driving mode information are satisfied based on driver state information of the host vehicle. The method further includes providing at least some of the driving mode information to the monitoring terminal based on the determination result.

In one implementation, the method may further include, in response to determining that the driver action conditions are not satisfied, requesting a specific driver action to satisfy the driver action conditions to a driver of the host vehicle In one implementation, providing the driving mode information may include providing at least some of the driving mode information to the monitoring terminal based on the request result.

In one implementation, providing the driving mode information may include providing at least some of the driving mode information to the monitoring terminal based on a specific provision range setting information. The specific provision range setting information may be acquired from among i) first provision range setting information for providing all of the driving mode information to the monitoring terminal or ii) second provision range setting information for providing some of the driving mode information to the monitoring terminal.

In one implementation, the method may further include, after the acquiring of the request for the driving mode information, verifying the monitoring terminal based on authentication information included in the request for the driving mode information.

In one implementation, the driving mode information may be provided to the monitoring terminal based on the verification result for the monitoring terminal.

In one implementation, the method may further include, after the providing of the driving mode information, providing, to a driver of the host vehicle, alarm information corresponding to the operation of providing at least some of the driving mode information to the monitoring terminal.

In one implementation, providing the driving mode information may include providing at least some of the driving mode information to the monitoring terminal based on a vehicle-to-everything (V2X) communication.

According to another aspect of the present disclosure, a device is provided for providing driving mode information. The device includes a memory storing computer-executable instructions. The device also includes at least one processor configured to access the memory and execute the computer-executable instructions. The at least one processor is configured to acquire a request for driving mode information of a host vehicle from a monitoring terminal outside the host vehicle. The processor is also configured to check the driving mode information corresponding to the host vehicle. The processor is additionally configured to determine whether driver action conditions corresponding to the driving mode information are satisfied based on driver state information of the host vehicle. The processor is also configured to provide at least some of the driving mode information to the monitoring terminal based on the determination result.

In one implementation, the at least one processor may be configured to request a specific driver action to satisfy the driver action conditions to a driver of the host vehicle when it is determined that the driver action conditions are not satisfied.

In one implementation, the at least one processor may be configured to provide at least some of the driving mode information to the monitoring terminal based on the request result.

In one implementation, the at least one processor may be configured to provide at least some of the driving mode information to the monitoring terminal based on a specific provision range setting information. The specific provision range setting information may be acquired from among i) first provision range setting information for providing all of the driving mode information to the monitoring terminal or ii) second provision range setting information for providing some of the driving mode information to the monitoring terminal.

In one implementation, the at least one processor may be configured to verify the monitoring terminal based on authentication information contained in the request for the driving mode information.

In one implementation, the at least one processor may be configured to provide the driving mode information to the monitoring terminal based on the verification result for the monitoring terminal.

In one implementation, the at least one processor may be configured to provide, to a driver of the host vehicle, alarm information corresponding to the operation of providing at least some of the driving mode information to the monitoring terminal.

In one implementation, the at least one processor may be configured to provide at least some of the driving mode information to the monitoring terminal based on a vehicle-to-everything (V2X) communication.

BRIEF DESCRIPTION OF THE DRAWINGS

The above and other objects, features, and advantages of the present disclosure should be more apparent from the following detailed description taken in conjunction with the accompanying drawings, in which.

In relation to the description of the drawings, the same or similar reference numerals may be used for the same or similar components.

DETAILED DESCRIPTION

Figure 1:
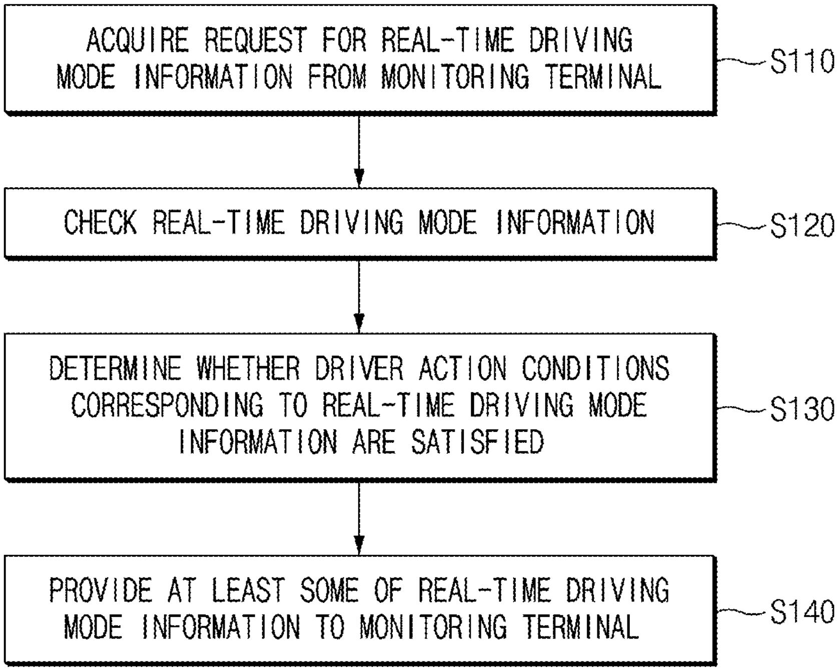
FIG. 1 is a flowchart illustrating a method for providing real-time driving mode information to a monitoring terminal, according to an embodiment disclosed in the present disclosure.

Hereinafter, embodiments of the present disclosure are described in detail with reference to the accompanying drawings. In adding the reference numerals to the components of the drawings, it should be noted that the identical or equivalent components are designated by the identical numeral even when the components are displayed on different drawings. Further, in describing the embodiments of the present disclosure, a detailed description of the related known configuration or function has been omitted where it was determined that the detailed description would obscure the gist of the present disclosure.

Various embodiments of the present disclosure are described below with reference to the accompanying drawings. However, the present disclosure is not intended to limit the technology described herein to the specific embodiments. Rather, the present disclosure should be understood to include various modifications, equivalents, and/or alternatives of the described embodiments. In connection with the description of the accompanying drawings, like reference numerals may be used for like components.

In describing the components of the embodiments according to the present disclosure, terms such as first, second, A, B, (a), (b), and the like may be used. These terms are merely intended to distinguish the components from other components. The terms do not limit the nature, order, or sequence of the components. Unless otherwise defined, all terms including technical and scientific terms used herein have the same meaning as commonly understood by one of ordinary skill in the art to which the present disclosure pertains. It should be further understood that terms, such as those defined in commonly used dictionaries, should be interpreted as having a meaning that is consistent with their meaning in the context of the relevant art. The terms should not be interpreted in an idealized or overly formal sense unless expressly so defined herein.

Expressions such as "first", "second", and the like used herein may modify various components regardless of order and/or importance. These terms are used to only distinguish one component from another component and do not limit the corresponding components. For example, a first user device and a second user device may represent different user devices regardless of the order or the importance. For example, without departing from the scope of the present disclosure, a first component may be referred to as a second component. Similarly, the second component may also be referred to as the first component.

As used herein, an expression such as "has", "may have", "include", "may include", and the like, refers to presence of a corresponding feature (e.g., a numerical value, a function, an operation, or a component such as a module) Such expressions do not exclude the presence of additional features.

When one component (e.g., the first component) is referred to as being "(operatively or communicatively) coupled with/to" another component (e.g., the second component), it should be understood that the one component may be directly coupled to the other component or may be connected to the other component via a still another component (e.g., a third component). On the other hand, when one component (e.g., the first component) is referred to as being "directly coupled with/to" another component (e.g., the second component), it may be understood that no still other component (e.g., the third component) exists between the one component and the other component.

The expression "configured to ~" used herein may be, for example, used interchangeably with "suitable for ~", "having the capacity to ~", "designed to ~", "adapted to ~", "made to ~", or "capable of ~" depending on circumstances.

The term "configured to ~" may not necessarily mean only "specifically designed to ~" in terms of hardware. Instead, in some circumstances, the expression "device configured to ~" may mean that the device is "capable of ~" in conjunction with other devices or components. For example, the phrase "processor configured to perform A, B, and C" may means a dedicated processor (e.g., an embedded processor) to perform the corresponding operations, or a generic-purpose processor (e.g., a CPU or an application processor) capable of performing the corresponding operations by executing one or more software programs stored in a memory device.

When a component, device, element, or the like of the present disclosure is described as having a purpose or performing an operation, function, or the like, the component, device, or element should be considered herein as being "configured to" meet that purpose or perform that operation or function.

Terms used herein are only used to describe specific embodiments. The terms are not intended to limit the scope of the present disclosure. A singular expression may include a plural expression unless the context clearly dictates otherwise. Terms used herein, including technical or scientific terms, have the same meaning as commonly understood by a person of ordinary skill in the art to which the present disclosure pertains. Among the terms used herein, terms defined in a general dictionary may be interpreted as having the same or similar meaning as the meaning in the context of the related art. The terms should not be interpreted as having ideal or excessively formal meaning unless explicitly defined herein. In some cases, even terms defined herein are not able to be interpreted to exclude the embodiments of the present disclosure.

In the present disclosure, expressions such as "A or B", "at least one of A or/and B", or "one or more of A or/and B" may include all possible combinations of the items listed together. For example, "A or B", "at least one of A and B", or "at least one of A or B" may refer to all cases including (1) at least one A, (2) at least one B, or (3) at least one A and at least one B. In addition, in describing the components of the embodiment of the present disclosure, each of phrases such as "A or B", "at least one of A and B", "at least one of A or B", "A, B, or C", "at least one of A, B, and C", "at least one of A, B, or C", and "at least one of A, B, or C, or any combination thereof" may include any one of the items listed together in the corresponding phrase, or all possible combinations thereof. For example, the phrase such as "at least one of A, B, or C, or any combination thereof" may include A or B or C or combinations thereof such as AB or ABC.

Hereinafter, embodiments of the present disclosure are described in detail with reference to FIGS. 1-3.

FIG. 1 is a flowchart illustrating a method for providing real-time driving mode information to a monitoring terminal, according to an embodiment disclosed in the present disclosure.

Referring to FIG. 1, in an operation S110, a device for providing real-time driving mode information may acquire a request for real-time driving mode information of a host vehicle from a monitoring terminal outside the host vehicle (.

The monitoring terminal outside the host vehicle may be a terminal of police that regulates violation of traffic regulations, for example.

The real-time driving mode information requested by the monitoring terminal may include current autonomous driving level information of the host vehicle. In an embodiment, autonomous driving levels may be classified for convenience into a level 0 (no automation), a level 1 (driver assistance), a level 2 (partial automation), a level 3 (conditional automation), a level 4 (high automation), and a level 5 (full automation).

As another example, the real-time driving mode information requested by the monitoring terminal may include the current autonomous driving level information of the host vehicle and information on a function corresponding thereto.

As another example, the real-time driving mode information requested by the monitoring terminal may include the current autonomous driving level information of the host vehicle, the information on the function corresponding thereto, and information on actions allowed for a driver.

In an example, if the request for the real-time driving mode information is acquired from the monitoring terminal, the device for providing the real-time driving mode information may verify the monitoring terminal by referring to (e.g., based on) authentication information contained in the request for the real-time driving mode information.

For example, if a request containing an authentication number is acquired from the monitoring terminal of the police that regulates the violation of the traffic regulations, the device for providing the real-time driving mode information may transmit the corresponding authentication number to a National Police Agency server and allow the National Police Agency server to check validity of the authentication number. Further, if the authentication number is checked to be valid by the National Police Agency server, the device for providing the real-time driving mode information may determine (e.g., verify) that the monitoring terminal requesting the real-time driving mode information is a valid monitoring terminal.

If the request for the real-time driving mode information of the host vehicle is acquired in operation S110, the device for providing the real-time driving mode information may, in an operation S120, check the real-time driving mode information corresponding to the host vehicle.

For example, the device for providing the real-time driving mode information may check a current autonomous driving level corresponding to the host vehicle and may transmit a query to a database to check i) a function in operation corresponding to the current autonomous driving level and ii) information on actions allowed for the driver while the corresponding function is in operation. As described in more detail below, the database may be checked by the host vehicle. However, the present disclosure is not limited thereto. For example, the database may be checked by the monitoring terminal.

In an embodiment, the database may be a remote server located outside the host vehicle. However, the present disclosure is not limited thereto. For example, the database may be mounted inside the host vehicle. Additionally, the database may be updated periodically and/or aperiodically. For example, if the database is mounted inside the host vehicle, the database may be updated via wired communication or wireless communication (e.g., over-the-air (OTA)).

For example, if the current autonomous driving level corresponding to the host vehicle is checked to be 1, the device for providing the real-time driving mode information may transmit the query to the database to check a function (e.g., a lane following assist (LFA)) corresponding to a current autonomous driving level 1 and information on actions allowed for the driver in the corresponding function (e.g., a maximum time hands are allowed to be off a steering wheel).

Table 1 shows example data stored in the database. For reference, for convenience, Table 1 only describes a specific autonomous driving level (the level 1) and a specific function (the LFA). However, the present disclosure is not limited thereto.

TABLE 1

| Autonomous driving level 1 | Function Lane Following Assist; LFA | Actions allowed for driver | | | | |
|---|---|---|---|---|---|---|
| | | Hand-Off Within n seconds | Eye-Off Not allowed | Game Not allowed | . . . . . . | Sleeping Not allowed |
| 1 | . . . | . . . | . . . | . . . | . . . | . . . |
| 2 | . . . | . . . | . . . | . . . | . . . | . . . |
| 3 | . . . | . . . | . . . | . . . | . . . | . . . |
| 4 | . . . | . . . | . . . | . . . | . . . | . . . |

Referring still to FIG. 1, if the real-time driving mode information of the host vehicle is checked in operation S120, the device for providing the real-time driving mode information may, in an operation S130, determine whether driver action conditions corresponding to the real-time driving mode information are satisfied by referring to (e.g., based on) driver state information of the host vehicle.

In various embodiments, the driver state information may be acquired via various systems mounted inside the host vehicle.

For example, information on whether the driver is currently drowsy or the like may be acquired via a driver drowsiness and attention warning system (DDAW).

Additionally, the driver action conditions corresponding to the real-time driving mode information may be conditions for actions allowed for the driver in the specific function in operation at the specific autonomous driving level.

For example, while the host vehicle is currently traveling at the autonomous driving level 1 and the lane following assist function corresponding to the autonomous driving level 1 is in operation, if the driver is currently playing a game in a driver's seat, is not looking ahead, is drowsy, or keeps taking the hands off the steering wheel, the driver action conditions are not satisfied, as may be seen in Table 1. In this case, the device for providing the real-time driving mode information may determine that the driver action conditions corresponding to the real-time driving mode information are not satisfied by referring to (e.g., based on) the driver state information of the host vehicle.

If it is determined that the driver action conditions are not satisfied, the device for providing the real-time driving mode information may request a specific driver action to satisfy the driver action conditions to the driver of the host vehicle.

For example, if the driver keeps taking hands off the steering wheel, a vibration sensor mounted on the steering wheel may be activated, an alarming sound may be output via a speaker, or a warning message may be output to the driver via a display screen to encourage the driver to grip the steering wheel.

As another example, if the driver is not looking ahead, the alarming sound may be output via a speaker or the warning message may be output to the driver via a display screen to encourage the driver to look ahead.

In an embodiment, the device for providing the real-time driving mode information may determine whether the number of requests to the driver of the host vehicle for the specific driver action to satisfy the driver action conditions is smaller than a threshold number before making the request to the driver.

If the number of requests is smaller than the threshold number, the device for providing the real-time driving mode information may repeat the process of requesting the specific driver action to the driver of the host vehicle and then determining whether the driver action conditions are satisfied.

If whether the driver action conditions are satisfied is determined based on the operation S130, the device for providing the real-time driving mode information may, in an operation S140, provide at least some of the real-time driving mode information to the monitoring terminal by referring to (e.g., based on) the determination result.

For example, the device for providing the real-time driving mode information may provide at least some of the real-time driving mode information to the monitoring terminal based on a vehicle-to-everything (V2X) communication.

In an example, if it is determined that driver action conditions are satisfied, the device for providing the real-time driving mode information may provide at least some of the real-time driving mode information to the monitoring terminal.

In an embodiment, the device for providing the real-time driving mode information may provide at least some of the real-time driving mode information to the monitoring terminal by additionally referring to the result of requesting the specific driver action to the driver.

For example, when the device for providing the real-time driving mode information has repeatedly requested the specific driver action to satisfy the driver action conditions to the driver of the host vehicle the threshold number (e.g., 3 times) because the driver action conditions were not satisfied, if the driver action conditions are still not satisfied, at least some of the real-time driving mode information may not be provided to the monitoring terminal. In other words, even though the driver action conditions are not satisfied, if the number of requests from the device for providing the real-time driving mode information is, for example, smaller than a predetermined threshold number, the device for providing the real-time driving mode information may not provide the real-time driving mode information to the monitoring terminal.

Further, as described above, if the verification process for the monitoring terminal is performed, the device for providing the real-time driving mode information may provide the real-time driving mode information to the monitoring terminal by additionally referring to the verification results for the monitoring terminal.

For example, if the monitoring terminal is verified to be the valid monitoring terminal, the device for providing the real-time driving mode information may provide the real-time driving mode information to the monitoring terminal.

As another example, if the monitoring terminal is an invalid monitoring terminal, the device for providing the real-time driving mode information may not provide the real-time driving mode information. In this case, the device for providing the real-time driving mode information may transmit an alarm message about the fact that the provision of the real-time driving mode information has been requested from the invalid monitoring terminal to a user (e.g., the driver).

In addition, with a range of the real-time driving mode information provided to the monitoring terminal set, the device for providing the real-time driving mode information may provide at least some of the real-time driving mode information to the monitoring terminal.

In one example, the range of the information provided may be determined by the user (e.g., the driver) of the host vehicle.

For example, one (specific provision range setting information) of i) first provision range setting information for providing all of the real-time driving mode information to the monitoring terminal or ii) second provision range setting information for providing some of the real-time driving mode information to the monitoring terminal may be input by the user.

Further, in an embodiment in which the specific provision range setting information is acquired, the device for providing the real-time driving mode information may provide at least some of the real-time driving mode information to the monitoring terminal by additionally referring to the specific provision range setting information.

For example, if the terminal of the police that regulates the violation of the traffic regulations is the monitoring terminal, the device for providing the real-time driving mode information may provide information in a minimum range specified in the traffic regulations to the monitoring terminal.

As another example, if the terminal of the police that regulates the violation of the traffic regulations is the monitoring terminal, the device for providing the real-time driving mode information may provide all of the real-time driving mode information to the monitoring terminal.

As another example, if the monitoring terminal is a general terminal located around the host vehicle (e.g., a terminal other than a terminal of the police that regulates the violation of the traffic regulations), the device for providing the real-time driving mode information may provide all of the real-time driving mode information to the monitoring terminal.

In addition, together with at least some of the real-time driving mode information provided to the monitoring terminal, alarm information corresponding to the operation of providing at least some of the real-time driving mode information to the monitoring terminal may be provided to the driver of the host vehicle.

In other words, the alarm information indicating that the real-time driving mode information is provided to the monitoring terminal may be provided to the driver of the host vehicle.

In an embodiment, a history of at least some of the real-time driving mode information provided to the monitoring terminal may be stored in the host vehicle or an external storage space. Additionally, the user may set a range of the stored history.

An example of a data format of the real-time driving mode information, according to an embodiment, is as follows.

For example, the data format of the real-time driving mode information may be a JSON data format as described below.

{"header": {"RES_ID": "ResType_Seq", "VIN": "VIN NUMBER", "RES_TIME": "YYYYMMDDHHmmss"},
"data1": [{"AUTONOMOUS LEVEL": "autonomous driving level (integer)",
"FUNTION NAME": "autonomous driving function name and description (character string)",
"ALLOWANCE-HANDS OFF": "hands-off available time", "ALLOWANCE-EYE OFF": "eye-off available time",
"ALLOWANCE-GAME": "YES or NO (character string)", ALLOWANCE-SLEEPING": "YES or NO (character string)"}], In an example, the real-time driving mode information may contain a header and data.

The header may include information on a response ID (RES_ID), a response type (ResType_Seq), a vehicle identification (VIN), and a response time (RES_TIME).

Additionally, the data may include information on the autonomous driving level (AUTONOMOUS LEVEL), an autonomous driving function name (FUNTION NAME), and an allowable function (ALLOWANCE-HANDS OFF or the like).

For example, in a case of "ALLOWANCE HANDS OFF": "15s", this may mean a limit time that the driver may take hands off the steering wheel under the autonomous driving function corresponding to the current autonomous driving level.

Because one autonomous function has been described above for convenience, the data format of the real-time driving mode information is described as including only "data1". However, if two or more autonomous functions are operable, a plurality of data may be included.

Figure 2:
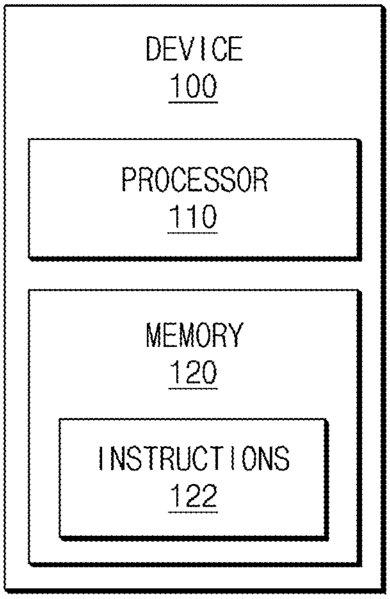
FIG. 2 is a block diagram showing a device for providing real-time driving mode information to a monitoring terminal, according to an embodiment disclosed in the present disclosure.

FIG. 2 is a block diagram showing a device for providing real-time driving mode information, according to an embodiment disclosed in the present disclosure.

A device 100 for providing the real-time driving mode information according to one embodiment may include a memory 120 storing computer-executable instructions and at least one processor 110 that accesses to the memory 120 and executes instructions 122.

The processor 110 may acquire the request for the real-time driving mode information of the host vehicle from the monitoring terminal outside the host vehicle.

The processor 110 may check the real-time driving mode information corresponding to the host vehicle.

The processor 110 may determine whether the driver action conditions corresponding to the real-time driving mode information are satisfied by referring to (e.g., based on) the driver state information of the host vehicle.

Additionally, the processor 110 may provide at least some of the real-time driving mode information to the monitoring terminal by referring to (e.g., based on) the determination result.

Accordingly, communication between the autonomous driving vehicles and an external ecosystem may be achieved efficiently, and unnecessary exercise of police power may be minimized.

Figure 3:
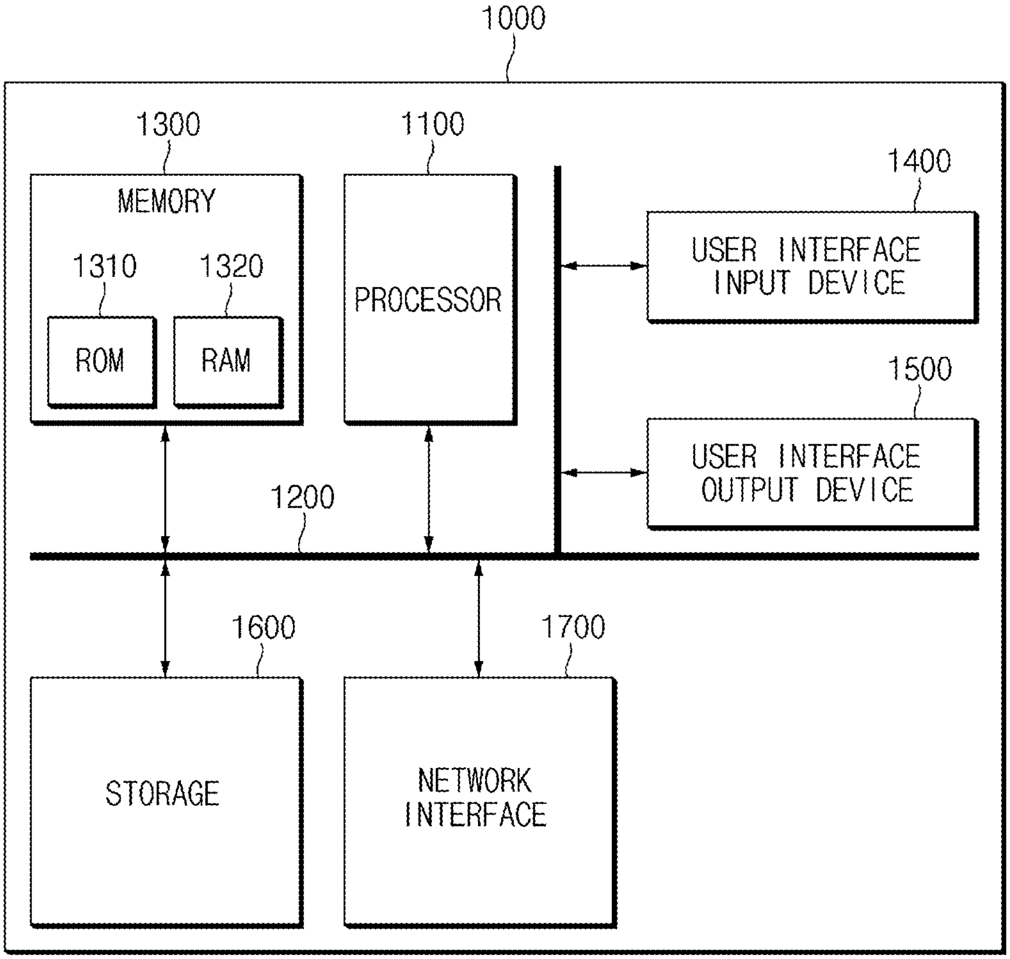
FIG. 3 is a block diagram of a computing system for executing a method for providing real-time driving mode information to a monitoring terminal, according to an embodiment of the present disclosure.

FIG. 3 is a diagram illustrating a computing system related to a method for providing real-time driving mode information or a device using the same, according to an embodiment of the present disclosure.

With reference to FIG. 3, a computing system 1000 related to the method for providing the real-time driving mode information or the device using the same, according to an embodiment of the present disclosure, may include at least one processor 1100, a memory 1300, a user interface input device 1400, a user interface output device 1500, storage 1600, and a network interface 1700 connected via a bus 1200.

The processor 1100 may be a central processing unit (CPU) or a semiconductor device that performs processing on commands stored in the memory 1300 and/or the storage 1600. The memory 1300 and the storage 1600 may include various types of volatile or non-volatile storage media. For example, the memory 1300 may include a ROM (Read Only Memory) and/or a RAM (Random Access Memory).

Thus, the operations of the method or the algorithm described in connection with the embodiments disclosed herein may be embodied directly in hardware or a software module executed by the processor 1100, or in a combination thereof. The software module may reside on a storage medium (e.g., the memory 1300 and/or the storage 1600) such as a RAM, a flash memory, a ROM, an EPROM, an EEPROM, a register, a hard disk, a removable disk, and a CD-ROM.

The storage medium may be coupled to the processor 1100. The processor 1100 may read information from, and write information to, the storage medium. In another method, the storage medium may be integral with the processor 1100. The processor 1100 and the storage medium may reside within an application specific integrated circuit (ASIC). The ASIC may reside within the user terminal. In another embodiment, the processor and the storage medium may reside as individual components in the user terminal.

The description above is merely illustrative of the technical idea of the present disclosure, and various modifications and changes may be made by those having ordinary skill in the art without departing from the essential characteristics of the present disclosure.

The embodiments described above may be realized with hardware components, software components, and/or combinations of the hardware components and the software components. For example, the device, the method, and the components described in the present disclosure may be, for example, realized using a general purpose computer or a special purpose computer, such as a processor, a controller, an arithmetic logic unit (ALU), a digital signal processor, a microcomputer, a field programmable gate array (FPGA), a programmable logic unit (PLU), a microprocessor, or any other device capable of executing and responding to instructions. A processing device may execute an operating system (OS) and a software application running on the operating system. The processing device may also access, store, manipulate, process, and generate data in response to the execution of the software. For convenience of understanding, the description above is made with reference to one processing device. However, a person having ordinary skill in the art should appreciate that the processing device may include a plurality of processing elements and/or a plurality types of processing elements. For example, the processing device may include a plurality of processors or one processor and one controller. In addition, the processing device may include other processing configurations, such as parallel processors.

The software may include a computer program, codes, instructions, or any combinations thereof and may configure the processing device to operate as desired or may command the processing device independently or collectively. The software and/or data may be permanently or temporarily embodied on any type of machine, component, physical device, virtual equipment, non-transitory computer readable storage medium or device, or transmitted signal wave to be interpreted by or to provide the instructions or the data to the processing device. The software may be distributed on networked computer systems and stored or executed in the distributed manner. The software and the data may be stored on a computer readable medium.

The method according to embodiments of the present disclosure may be implemented in a form of program instructions that may be executed via various computer means and recorded on the computer readable medium. The computer readable medium may include a program instruction, a data file, a data structure, or the like, alone or in combination. The program instruction recorded on the medium may be specially designed and configured for the embodiment or may be known to those having ordinary skill in the art to which the present disclosure pertains. Examples of the computer readable recording media include magnetic media such as a hard disk, a floppy disk, and a magnetic tape, optical media such as a CD-ROM and a DVD, magneto-optical media such as a floptical disk, and hardware devices specially configured to store and execute the program instructions such as a ROM, a RAM, and a flash memory. Examples of the program instructions include high-level language codes that may be executed by the computer using an interpreter or the like, as well as machine language codes such as those produced by a compiler.

The hardware device described above may be configured to operate with one or a plurality of software modules to perform the operation of the embodiments, and vice versa.

Although the present disclosure has been described with reference to certain embodiments and the accompanying drawings, those having ordinary skill in the art may apply various technical modifications and variations without departing from the scope of the present disclosure. For example, even when the described techniques are performed in an order different from that in the method described, and/or the components of the described system, structure, device, circuit, and the like are coupled or combined with each other in a form different from that in the method described, or other components are replaced with or substituted by equivalents, appropriate results may be achieved.

Therefore, other implementations, other embodiments, and equivalents of the claims are within the scope of the following claims.

The embodiments disclosed in the present disclosure are not intended to limit the technical idea of the present disclosure but to illustrate the present disclosure, and the scope of the technical idea of the present disclosure is not limited by the embodiments. The scope of the present disclosure should be construed as being covered by the scope of the appended claims, and all technical ideas falling within the scope of the claims should be construed as being included in the scope of the present disclosure.

Embodiments of the present disclosure provide a method for providing the driving mode information of the traveling vehicle and the device using the same.

Embodiments of the present disclosure provide a method for providing the driving mode information of the traveling vehicle based on the V2X communication and the device using the same.

Embodiments of the present disclosure provide a method for accurately providing the driving mode information of the traveling vehicle to the specific target terminal and the device using the same.

According to embodiments of the present disclosure, a possibility of an occurrence of traffic accidents may be reduced by inducing correction of the action of the driver.

In addition, various effects that are directly or indirectly identified through the present disclosure may be provided.

Hereinabove, although the present disclosure has been described with reference to certain embodiments and the accompanying drawings, the present disclosure is not limited thereto. Rather, the present disclosure may be variously modified and altered by those having ordinary skill in the art to which the present disclosure pertains without departing from the spirit and scope of the present disclosure claimed in the following claims.

What is claimed is:

1. A method comprising:

acquiring a request for driving mode information of a host vehicle from a monitoring terminal outside the host vehicle;

verifying the monitoring terminal based on authentication information included in the request for the driving mode information;

checking the driving mode information corresponding to the host vehicle;

determining whether driver action conditions corresponding to the driving mode information are satisfied based on driver state information of the host vehicle;

providing at least some of the driving mode information to the monitoring terminal based on the determination result; and controlling at least one of a vibration sensor mounted on a steering wheel of the host vehicle, a speaker, or a display screen of the host vehicle to output a warning to a driver of the host vehicle to satisfy the driver action conditions, based on the determination result.

2. The method of claim 1, further comprising, in response to determining that the driver action conditions are not satisfied, requesting a specific driver action to satisfy the driver action conditions to the driver of the host vehicle.

3. The method of claim 2, wherein providing the driving mode information includes providing at least some of the driving mode information to the monitoring terminal based on an acquired request result for the driving mode information.

4. The method of claim 1, wherein providing the driving mode information includes providing at least some of the driving mode information to the monitoring terminal based on a specific provision range setting information, wherein the specific provision range setting information is acquired from among i) first provision range setting information for providing all of the driving mode information to the monitoring terminal or ii) second provision range setting information for providing some of the driving mode information to the monitoring terminal.

5. The method of claim 1, wherein the driving mode information is provided to the monitoring terminal based on the verification result for the monitoring terminal.

6. The method of claim 1, further comprising, after the providing of the driving mode information, providing, to the driver of the host vehicle, alarm information corresponding to the operation of providing at least some of the driving mode information to the monitoring terminal.

7. The method of claim 1, wherein providing the driving mode information includes providing at least some of the driving mode information to the monitoring terminal based on a vehicle-to-everything (V2X) communication.

8. A device for providing driving mode information, the device comprising:

a memory storing computer-executable instructions; and at least one processor configured to access to the memory and execute the computer-executable instructions, wherein the at least one processor is configured to acquire a request for driving mode information of a host vehicle from a monitoring terminal outside the host vehicle, verify the monitoring terminal based on authentication information included in the request for the driving mode information, check the driving mode information corresponding to the host vehicle, determine whether driver action conditions corresponding to the driving mode information are satisfied based on driver state information of the host vehicle, provide at least some of the driving mode information to the monitoring terminal based on the determination result, and control at least one of a vibration sensor mounted on a steering wheel of the host vehicle, a speaker, or a display screen of the host vehicle to output a warning to a driver of the host vehicle to satisfy the driver action conditions, based on the determination result.

9. The device of claim 8, wherein the at least one processor is configured to request a specific driver action to satisfy the driver action conditions to the driver of the host vehicle when it is determined that the driver action conditions are not satisfied.

10. The device of claim 9, wherein the at least one processor is configured to provide at least some of the driving mode information to the monitoring terminal based on an acquired request result for the driving mode information.

11. The device of claim 8, wherein the at least one processor is configured to provide at least some of the driving mode information to the monitoring terminal based on a specific provision range setting information, wherein the specific provision range setting information is acquired from among first provision range setting information for providing all of the driving mode information to the monitoring terminal or ii) second provision range setting information for providing some of the driving mode information to the monitoring terminal.

12. The device of claim 8, wherein the at least one processor is configured to provide the driving mode information to the monitoring terminal based on the verification result for the monitoring terminal.

13. The device of claim 8, wherein the at least one processor is configured to provide, to the driver of the host vehicle, alarm information corresponding to the operation of providing at least some of the driving mode information to the monitoring terminal.

14. The device of claim 8, wherein the at least one processor is configured to provide at least some of the driving mode information to the monitoring terminal based on a vehicle-to-everything (V2X) communication.

* * * * *